United States Patent
Goodwin

(10) Patent No.: US 9,288,256 B2
(45) Date of Patent: Mar. 15, 2016

(54) URL PREFETCHING

(71) Applicant: Ensighten, Inc., San Jose, CA (US)

(72) Inventor: Joshua C. Goodwin, Mountain View, CA (US)

(73) Assignee: Ensighten, Inc., San Jose, CA (US)

(*) Notice: Subject to any disclaimer, the term of this patent is extended or adjusted under 35 U.S.C. 154(b) by 0 days.

(21) Appl. No.: 14/683,352

(22) Filed: Apr. 10, 2015

(65) Prior Publication Data

US 2015/0295988 A1 Oct. 15, 2015

Related U.S. Application Data

(60) Provisional application No. 61/978,814, filed on Apr. 11, 2014.

(51) Int. Cl.
*H04L 29/08* (2006.01)
*G06Q 30/00* (2012.01)

(52) U.S. Cl.
CPC .......... *H04L 67/02* (2013.01); *H04L 67/1095* (2013.01); *H04L 67/2847* (2013.01); *H04L 67/20* (2013.01)

(58) Field of Classification Search
CPC ..... H04L 67/02; H04L 67/1095; H04L 67/20; H04L 67/2842; H04L 67/2847; G06Q 30/00
See application file for complete search history.

(56) References Cited

U.S. PATENT DOCUMENTS

| | | | |
|---|---|---|---|
| 6,836,799 B1 | 12/2004 | Philyaw et al. | |
| 7,400,251 B2 * | 7/2008 | Czyszczewski | G06Q 10/087 340/12.25 |
| 7,685,168 B2 | 3/2010 | Koinuma et al. | |
| 7,685,200 B2 | 3/2010 | Gunawardena et al. | |
| 7,805,670 B2 | 9/2010 | Lipton et al. | |
| 7,823,059 B2 | 10/2010 | Hodgkinson | |
| 7,890,461 B2 | 2/2011 | Oeda et al. | |
| 7,908,336 B2 | 3/2011 | Carlson et al. | |
| 7,992,135 B1 | 8/2011 | Wong et al. | |
| 8,010,890 B2 | 8/2011 | Gumz et al. | |
| 8,131,861 B2 | 3/2012 | Butler et al. | |
| 8,316,188 B2 | 11/2012 | Kadambi et al. | |

(Continued)

FOREIGN PATENT DOCUMENTS

| | | |
|---|---|---|
| CN | 102693501 | 9/2012 |
| WO | 2009009109 A1 | 1/2009 |

(Continued)

OTHER PUBLICATIONS

U.S. Appl. No. 14/149,717, filed Jan. 1, 2014, Glommen, et al.

(Continued)

*Primary Examiner* — Patrice Winder
(74) *Attorney, Agent, or Firm* — Banner & Witcoff, Ltd.

(57) ABSTRACT

An enhanced tag management system is disclosed comprising a networked resource/asset prefetch feature. In some examples, the tag management system comprises a recommendation system, a collection system, a non-volatile data store, a user computing device with cache memory, and/or other components. The enhanced tag management system permits prefetching of resource/assets, such as images, videos, widgets, etc., while avoiding the skewing of analytical results. As a result, a user computing device may enjoy enhanced performance and reduced latency without sacrificing the reliability of collected analytics data.

14 Claims, 8 Drawing Sheets

(56) References Cited

U.S. PATENT DOCUMENTS

| | | | |
|---|---|---|---|
| 8,375,319 B2 | 2/2013 | Decker et al. | |
| 8,407,321 B2 | 3/2013 | Mickens et al. | |
| 8,429,243 B1 | 4/2013 | Wang et al. | |
| 8,539,345 B2 | 9/2013 | Appleyard et al. | |
| 8,560,610 B2 | 10/2013 | Lunt et al. | |
| 9,081,789 B2 | 7/2015 | Anderson | |
| 2001/0042171 A1 | 11/2001 | Vermeulen | |
| 2002/0078147 A1 | 6/2002 | Bouthors et al. | |
| 2002/0078165 A1 | 6/2002 | Genty et al. | |
| 2002/0083167 A1 | 6/2002 | Costigan et al. | |
| 2003/0001888 A1 | 1/2003 | Power | |
| 2003/0184452 A1 | 10/2003 | Goodgoll | |
| 2004/0054784 A1 | 3/2004 | Busch et al. | |
| 2004/0083259 A1 | 4/2004 | Tenembaum | |
| 2004/0123044 A1 | 6/2004 | Franaszek | |
| 2005/0125290 A1 | 6/2005 | Beyda et al. | |
| 2005/0138143 A1 | 6/2005 | Thompson | |
| 2005/0154781 A1 | 7/2005 | Carlson et al. | |
| 2005/0165643 A1 | 7/2005 | Wilson et al. | |
| 2006/0031778 A1 | 2/2006 | Goodwin et al. | |
| 2006/0271669 A1 | 11/2006 | Bouguenon et al. | |
| 2007/0250618 A1 | 10/2007 | Hammond | |
| 2008/0046562 A1 | 2/2008 | Butler | |
| 2008/0077561 A1 | 3/2008 | Yomtobian | |
| 2008/0114773 A1 | 5/2008 | Choi et al. | |
| 2008/0244051 A1 | 10/2008 | Morris | |
| 2009/0006945 A1 | 1/2009 | Gumz et al. | |
| 2009/0248494 A1 | 10/2009 | Hueter et al. | |
| 2009/0293001 A1 | 11/2009 | Lu et al. | |
| 2010/0179967 A1 | 7/2010 | Zhang et al. | |
| 2010/0228850 A1 | 9/2010 | Fomitchev | |
| 2010/0251128 A1 | 9/2010 | Cordasco | |
| 2010/0281008 A1 | 11/2010 | Braunwarth | |
| 2010/0318976 A1 | 12/2010 | Everly et al. | |
| 2011/0015981 A1 | 1/2011 | Subramanian | |
| 2011/0055314 A1 | 3/2011 | Rosenstein et al. | |
| 2011/0055710 A1 | 3/2011 | Kirkby et al. | |
| 2011/0082858 A1 | 4/2011 | Yu et al. | |
| 2011/0093461 A1 | 4/2011 | Mui et al. | |
| 2011/0119374 A1 | 5/2011 | Ruhl et al. | |
| 2011/0153422 A1 | 6/2011 | Cousins | |
| 2011/0153796 A1 | 6/2011 | Branson | |
| 2011/0167391 A1 | 7/2011 | Momeyer et al. | |
| 2011/0185016 A1 | 7/2011 | Kandasamy et al. | |
| 2011/0219115 A1 | 9/2011 | Capel et al. | |
| 2011/0246879 A1 | 10/2011 | White et al. | |
| 2011/0282739 A1 | 11/2011 | Mashinsky et al. | |
| 2011/0296322 A1 | 12/2011 | Dhanjal et al. | |
| 2011/0302306 A1 | 12/2011 | Hanson et al. | |
| 2011/0314092 A1 | 12/2011 | Lunt et al. | |
| 2012/0005257 A1 | 1/2012 | Narayanan et al. | |
| 2012/0016836 A1 | 1/2012 | Fender et al. | |
| 2012/0054596 A1 | 3/2012 | Kroger et al. | |
| 2012/0124131 A1 | 5/2012 | Muret et al. | |
| 2012/0154292 A1 | 6/2012 | Zhao et al. | |
| 2012/0169624 A1 | 7/2012 | Garn et al. | |
| 2012/0221411 A1 | 8/2012 | Graham, Jr. | |
| 2013/0073401 A1 | 3/2013 | Cook | |
| 2013/0086484 A1 | 4/2013 | Antin et al. | |
| 2013/0091025 A1 | 4/2013 | Farahat et al. | |
| 2013/0124332 A1 | 5/2013 | Doughty et al. | |
| 2013/0191208 A1 | 7/2013 | Chourey et al. | |
| 2013/0282898 A1 | 10/2013 | Kalus et al. | |
| 2013/0290480 A1 | 10/2013 | Manion et al. | |
| 2013/0332604 A1 | 12/2013 | Seth et al. | |
| 2014/0013203 A1 | 1/2014 | Rogoveanu | |
| 2014/0081981 A1 | 3/2014 | Morris | |
| 2014/0215050 A1 | 7/2014 | Lu | |
| 2014/0379840 A1* | 12/2014 | Dao | H04L 67/2847 709/213 |
| 2015/0200994 A1* | 7/2015 | Jain | H04L 67/02 709/219 |

FOREIGN PATENT DOCUMENTS

| | | | |
|---|---|---|---|
| WO | 2011128924 A1 | 10/2011 | |
| WO | 2013003302 A1 | 3/2013 | |
| WO | 03/085560 A1 | 10/2013 | |

OTHER PUBLICATIONS

U.S. Appl. No. 14/151,700, filed Jan. 9, 2014, Anderson, et al.
U.S. Appl. No. 14/159,062, filed Jan. 20, 2014, Koo, et al.
U.S. Appl. No. 14/216,801, filed Mar. 17, 2014, Glommen.
Access your campaign reports in Google Analytics, http://help.campaignmonitor.com/topic.aspx?t=112, retrieved on Feb. 10, 2014, 5 pages.
Adobe Analytics/Tag management, http://www.adobe.com/in/solutions/digital-analytics/tag-management.htmt, retrieved Feb. 10, 2014, 1 page.
Behnam, Ali, "Taking Your Test Platform to the Next Level", http://tealsium.com/blog/digital-markting/taking-your-test-platform-to-the-next-level, retrieved Jan. 12, 2014, 10 pages.
Boosting Marketing Agility With Enterprise Tag & Data Management, Ensighten, dated Jun. 2013, 14 pages.
eVisit Analyst 8 Features, http://www.evisitanalyst.com/eva8, retrieved Feb. 10, 2014, 6 pages.
Handwrite on mobile, https://support.google.com/websearch/answer/2649515?p=sbw_tips&hl=en&rd=2, retrieved Jan. 12, 2014, 3 pages.
Improving Testing & Optimization Through Tag Management, Key Factors to Consider When Choosing the Right Tag Management Solution, Tealium, dated Sep. 2013, 12 pages.
Padolsey, James, "Avoiding DOM flickering", published Jul. 23, 2009, james.padolsey.com/javascript/avoiding-dom-flickering/, 6 pages.
Site Tagging Best Practices, Version 1.0 Draft Public Comment, iab (Interactive Advertising Bureau), dated Nov. 12, 2012, 18 pages.
'website: TheScarms', "ASP.net V2.0 Client-Side JavaScript Callbacks (AJAX)", published Jul. 18, 2007, http://web.archive.org/web/20070718054551/http://www.thescarms.com/dotnet-/ajax.aspx, 4 pages.
West, Josh, "Tag management systems; How do I choose?", Demystified, dated Jul. 29, 2013, http://josh.webanalyticsdemystified.com/?p=25, 5 pages.
May 21, 2014—(PCT) International Search Report and Written Opionion—App PCT/US2014/012217.
Preload CSAS/JavaScript without execution, http://www.phpied.com/preload-cssjavascript-without-execution, dated Apr. 21, 2010, 14 pages.
"What are the ways to load JavaScript or CSS without executing them?", http;//stackoverflow.com/questions/8843132/what-are-the-ways-to-load-java-script-or-css-without-executing-them, retrieved Sep. 27, 2013, 4 pages.
Zakas, Nicholas C, "Separating JavaScript download and execution", http://www.nczonline.net/blog/2011/02/14/separating-javascript-download-a-nd-execution, posed Feb. 14, 2011, 7 pages.
Dec. 29, 2014—(PCT) International Search Report and Written Opinion—App. PCT/US2014/052774.
Dec. 8, 2014—(PCT) International Search Report and Written Opinion—App. PCT/US2014/052766.
Jan. 29, 2015—(PCT) International Search Report and Written Opinion—App. PCT/US2014/063927.
HTML5 Link Prefetching, David Walsh, Jul. 7, 2010, http://davidwalsh.name/html5-prefetch, downloaded Apr. 11, 2014, 12 pages.
Link prefetching FAQ, https://developer.mozilla.org/en-US/docs/Link_prefetching_FAQ, downloaded Apr. 11, 2014, 5 pages.
Prerender and prefetch support, http://msdn.microsoft.com/en-us/library/ie/dn265039(v+vs.85).asp#improve-performance_by_getting_things_in_advance, downloaded Apr. 11, 2014, 3 pages.
Link prefetching, http://en.wikipedia.org/wiki/Link_prefetching, downloaded Apr. 11, 2014, 3 pages.
TagMan Joins Forces With Digital Fulcrum to Accelerate Page Load, http://www.tagman.com/mdp-blog/2012/02/tagman-joins-forces-with-digital-fulcrum-to-accelerate-page-load, posted Feb. 9, 2015, 2 pages.

(56) References Cited

OTHER PUBLICATIONS

TagMan and Digital Fulcrum Join Forces to Optimize Performance of Legacy 3rd Party Tags, Feb. 9, 2012, http://www.tagman.com.

Jul. 23, 2015—(PCT)—Written Opinion of the International Searching Authority—App. PCT/US2015/025325.
Jul. 23, 2015—(PCT) International Search Report—App. PCT/US2015/025325.

* cited by examiner

URL PREFETCHING

This application claims the benefit of priority from U.S. Provisional Patent Application Ser. No. 61/978,814, filed Apr. 11, 2014, and which is herein incorporated by reference in its entirety.

In one example, a system including one or more of the features described herein may be built upon or incorporate aspects of a tag delivery system as described in U.S. patent application Ser. No. 13/843,849, which published as U.S. Patent Application Publication No. 2013/0290480 on Oct. 30, 2013, which is herein incorporated by reference in its entirety.

BACKGROUND

Site performance has an impact on user engagement and directly impacts conversion metrics. As websites become more sophisticated, browsers have to pull down more resources during page load, resulting in slower site performance. Apart from technically optimizing each page for performance, there are limited options for a marketer to improve site performance. In addition, some caching techniques can result in skewed analytics being collected. For example, some web assets (e.g., images) are commonly used for web analytics, and would thus skew analytical results if they were requested prematurely. Opportunities exist for improvements in the art.

BRIEF SUMMARY

Aspects of the disclosure address one or more of the drawbacks mentioned above by disclosing methods, computer readable media, and apparatuses associated with a tag delivery network that employs one or more aspects of prefetching disclosed herein.

Aspects of the disclosure address one or more of the issues mentioned above by disclosing methods, computer readable media, and apparatuses for a tag management system comprising a networked resource/asset prefetch feature. In one example, the tag management system may involve a tag manager comprising first program instructions configured to regulate execution of analytics tags at the user terminal and second program instructions configured to request and process a prefetch recommendation. The tag manager may executed on a user terminal analytics tags are associated with a web page. Meanwhile, the tag manager may bypass execution of analytics tags in those web pages downloaded/cached as part of a prefetch.

With another aspect of the disclosure, a recommendation system and collection system may communicate with a data store of aggregated data to estimate which web page(s) are likely to be next in a navigation sequence, then generating a prefetch recommendation.

Aspects of the disclosure may be provided in a computer-readable medium having computer-executable instructions to perform one or more of the process steps described herein.

This summary is provided to introduce a selection of concepts in a simplified form that are further described below in the detailed description. The summary is not intended to identify key features or essential features of the claimed subject matter, nor is it intended to be used to limit the scope of the claimed subject matter. Moreover, one or more of the steps and/or components described above may be optional or may be combined with other steps.

BRIEF DESCRIPTION OF FIGURES

Systems and methods are illustrated by way of example and are not limited in the accompanying figures in which like reference numerals indicate similar elements and in which.

DETAILED DESCRIPTION

Figure 1:
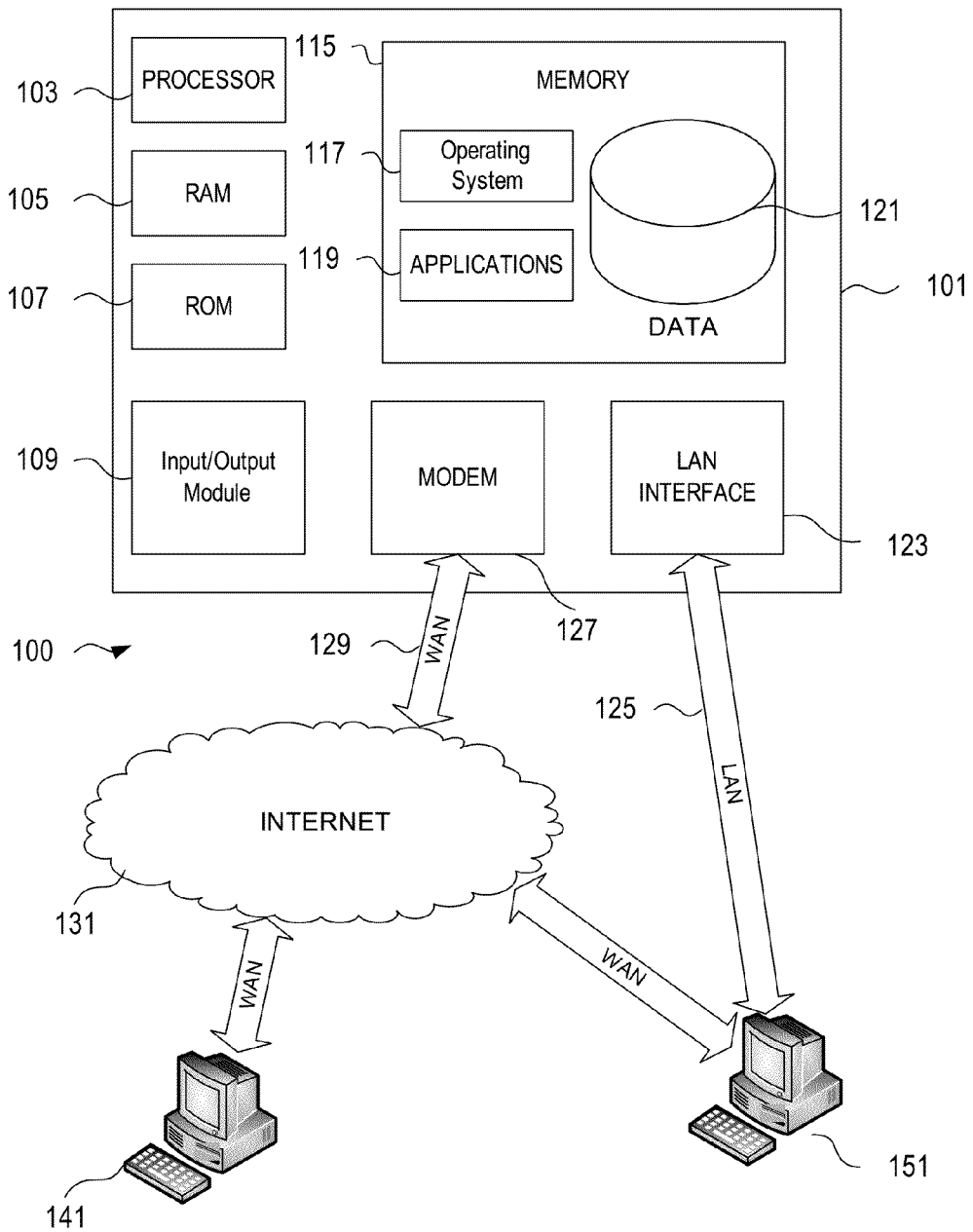
FIG. 1 shows an illustrative operating environment in which various aspects of the disclosure may be implemented.

In light of the foregoing background, the following presents a simplified summary of the present disclosure in order to provide a basic understanding of some aspects of the concepts disclosed herein. This description is not an extensive overview of the invention. This description is not intended to identify key features or essential features of the claimed subject matter, nor is it intended to be used to limit the scope of the claimed subject matter. This description is provided to introduce a selection of concepts in a simplified form that are further described below. It is to be understood that other embodiments may be utilized and structural and functional modifications may be made.

In accordance with various aspects of the disclosure, methods, computer-readable media, and apparatuses are disclosed involving an enhanced tag management system comprising a networked resource/asset prefetch feature. In some examples, the tag management system comprises a recommendation system, a collection system, a non-volatile data store, a user computing device with cache memory, and/or other components. The enhanced tag management system permits prefetching of resource/assets, such as images, videos, widgets, etc., while avoiding the skewing of analytical results. As a result, a user computing device may enjoy enhanced performance and reduced latency without sacrificing the reliability of collected analytics data.

One example of a tag management system is disclosed in which an entity manages the delivery of content and program instructions that have been customized for each individual and/or web page. This entity (e.g., a web consulting company) may use aspects of the disclosure to route customized content/instructions to a web browser and/or other computer applications. In general, aspects of the disclosure may be used to manipulate existing objects and add new objects to web pages. Within this context, an object may include both visual and non-visual elements on a web page. As part of the content/instruction delivery vehicle, a front-end user interface may facilitate a non-technical user to describe and implement object creation and manipulation. To provide these services, the entity may take advantage of both internal and external computing and storage capabilities. One example of program instructions delivered to a web browser and/or other application includes those related to initiate the capture of web analytics data when a user terminal accesses a client web page. This collected data may include the name of the web page visited, the download time of the web page, a setting of a cookie for the web page, and the movement of a mouse over a particular object (i.e., "mouse overs") on a web page. In addition, content such as advertisements, modified images, buttons, and other graphics may be customized to a particular user through this service.

Certain embodiments of this disclosure allow for a content/tag management system/method/program executable instructions that is/are referenced with a single line of computer code that is inserted as a single tag and references a JavaScript™ file. The execution of program instructions in the JavaScript™ file may take care of all tag management, updates, configuration changes, and any other customizations that clients may wish to perform. Third-party vendors may be removed from a client website to allow the manager to take responsibility for delivering the correct program instructions/content at the correct time.

In the following description of the various embodiments of the disclosure, reference is made to the accompanying drawings, which form a part hereof, and in which is shown by way of illustration, various embodiments in which the disclosure may be practiced. It is to be understood that other embodiments may be utilized and structural and functional modifications may be made.

FIG. 1 illustrates a block diagram of a tag/content manager 101 (e.g., a computer server) in communication system 100 that may be used according to an illustrative embodiment of the disclosure. The manager 101 may have a processor 103 for controlling overall operation of the manager 101 and its associated components, including RAM 105, ROM 107, input/output module 109, and memory 115.

I/O 109 may include a microphone, keypad, touch screen, and/or stylus through which a user of device 101 may provide input, and may also include one or more of a speaker for providing audio output and a video display device for providing textual, audiovisual and/or graphical output. Software may be stored within memory 115 to provide instructions to processor 103 for enabling manager 101 to perform various functions. For example, memory 115 may store software used by the manager 101, such as an operating system 117, application programs 119, and an associated database 121. Processor 103 and its associated components may allow the manager 101 to run a series of computer-readable instructions to deploy program instructions according to the type of request that the manager receives. For instance, if a client requests that program instructions for capturing mouse movements for complete session replay be executed, manager 101 may transmit the appropriate instructions to a user's computer when that user visits the client's website.

The manager 101 may operate in a networked environment supporting connections to one or more remote computers, such as terminals 141 and 151. The terminals 141 and 151 may be personal computers or servers that include many or all of the elements described above relative to the manager 101. Alternatively, terminal 141 and/or 151 may be part of a "cloud" computing environment located with or remote from manager 101 and accessed by manager 101. The network connections depicted in FIG. 1 include a local area network (LAN) 125 and a wide area network (WAN) 129, but may also include other networks. When used in a LAN networking environment, the manager 101 is connected to the LAN 125 through a network interface or adapter 123. When used in a WAN networking environment, the server 101 may include a modem 127 or other means for establishing communications over the WAN 129, such as the Internet 131. It will be appreciated that the network connections shown are illustrative and other means of establishing a communications link between the computers may be used. The existence of any of various well-known protocols such as TCP/IP, Ethernet, File Transfer Protocol (FTP), Hypertext Transfer Protocol (HTTP) and the like is presumed.

Additionally, an application program 119 used by the manager 101 according to an illustrative embodiment of the disclosure may include computer executable instructions for invoking functionality related to delivering program instructions and/or content.

Computing device 101 and/or terminals 141 or 151 may also be mobile terminals including various other components, such as a battery, speaker, and antennas (not shown).

The disclosure is operational with numerous other general purpose or special purpose computing system environments or configurations. Examples of well known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, and distributed computing environments that include any of the above systems or devices, and the like.

The disclosure may be described in the general context of computer-executable instructions, such as program modules, being executed by a computer. Generally, program modules include routines, programs, objects, components, data structures, etc. that perform particular tasks or implement particular abstract data types. The disclosure may also be practiced in distributed computing environments where tasks are performed by remote processing devices that are linked through a communications network. In a distributed computing environment, program modules may be located in both local and remote computer storage media including memory storage devices.

Figure 2:
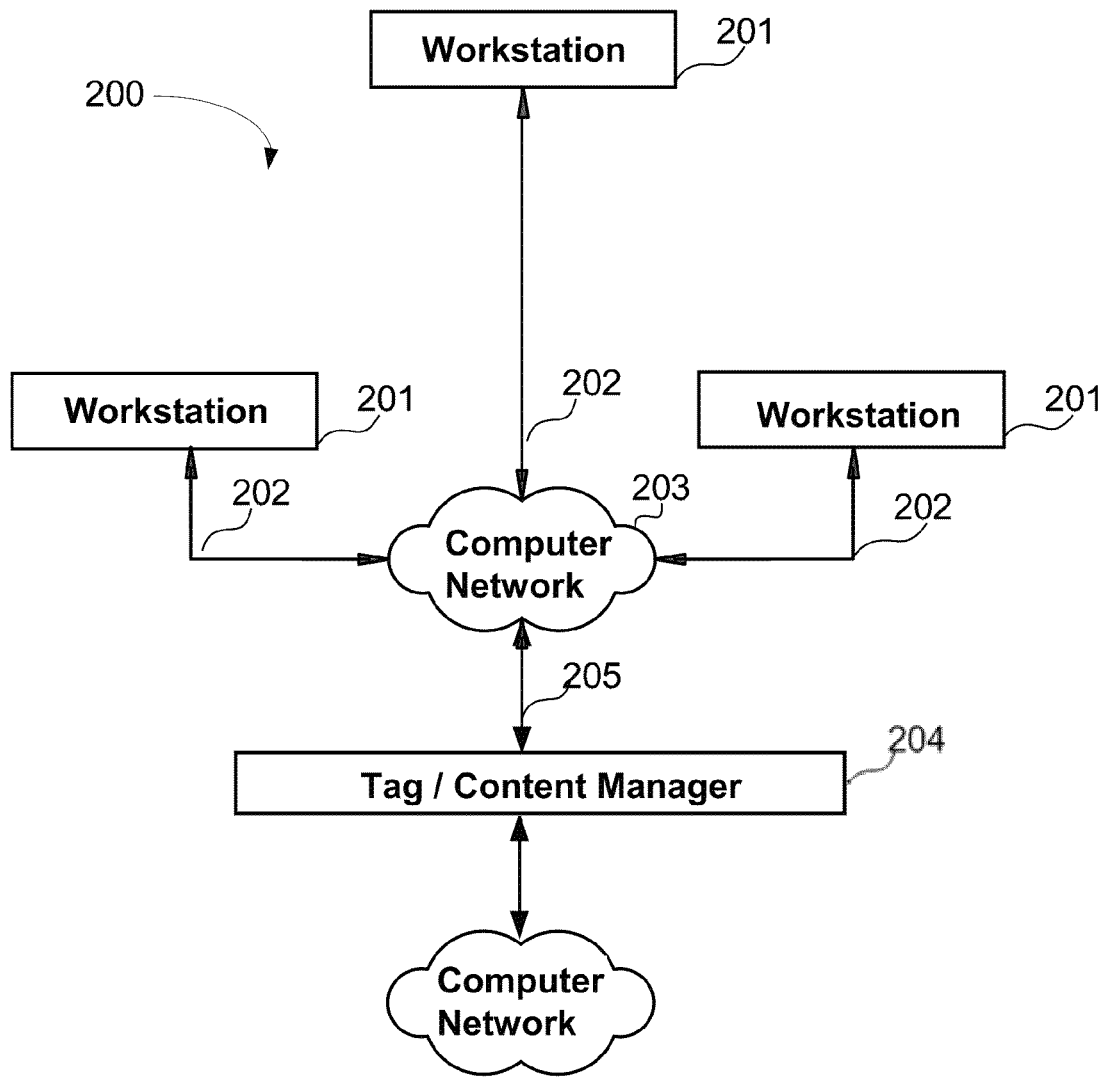
FIG. 2 is an illustrative block diagram of workstations and servers that may be used to implement the processes and functions of certain aspects of the disclosure.
Figure 3:
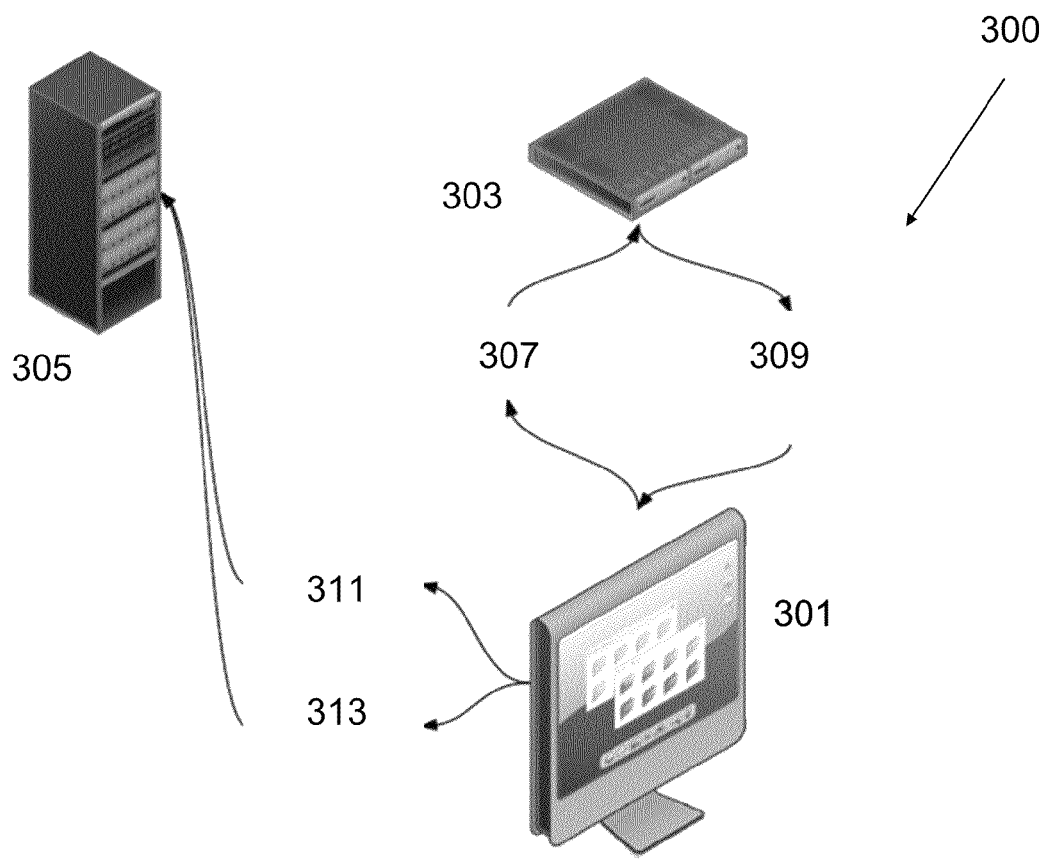
FIG. 3 shows a tag/content management system operating in a network in accordance with certain aspects of the disclosure.
Figure 4:
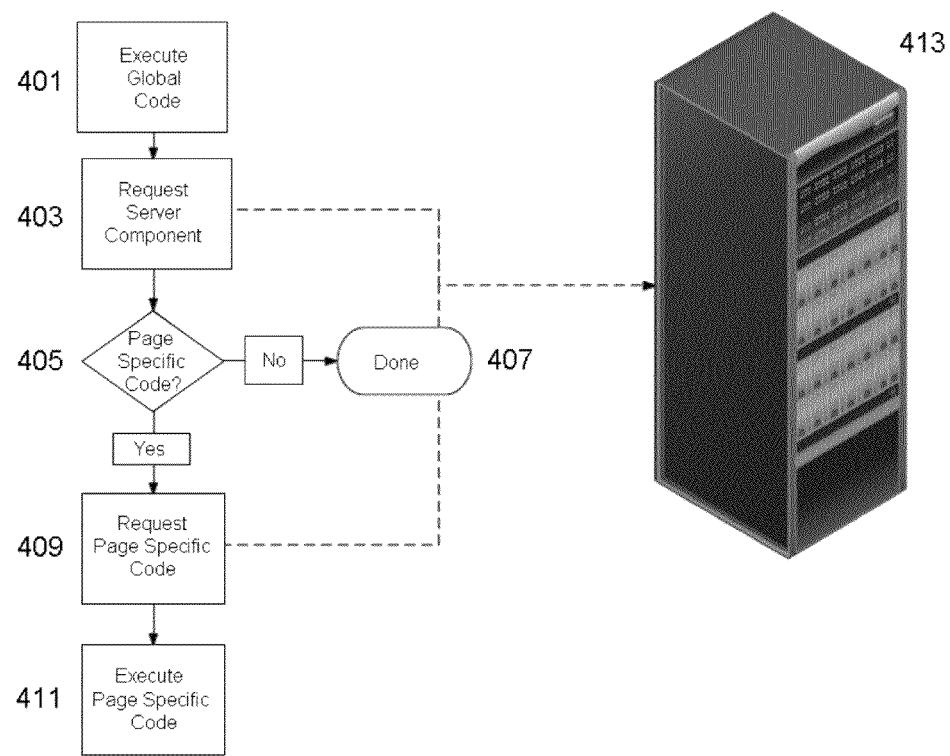
FIG. 4 shows a flow diagram for using a tag/content manager program to execute both global and page specific code in accordance with certain aspects of the disclosure.
Figure 5:
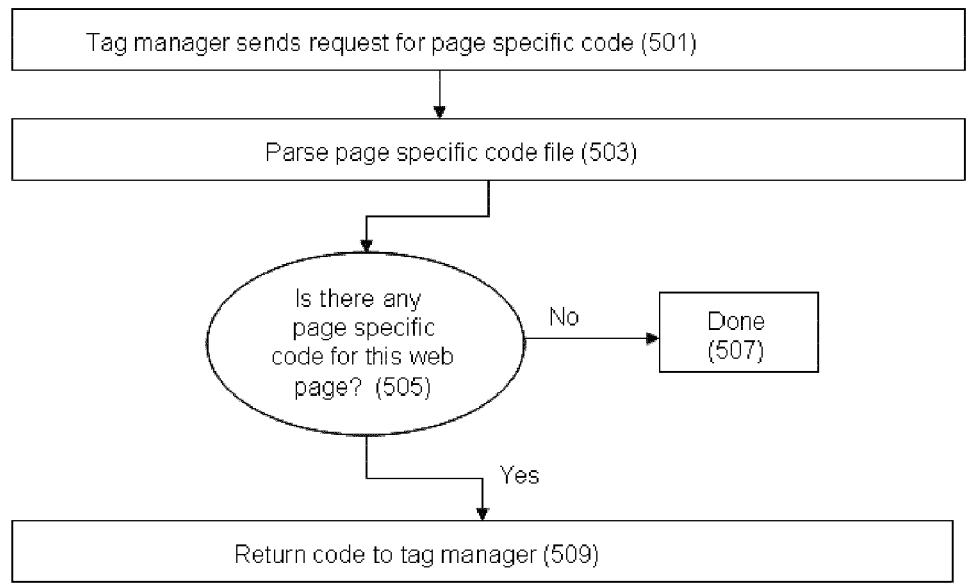
FIG. 5 shows a flow diagram for delivering page specific code to a tag management system in accordance with certain aspects of the disclosure.
Figure 6:
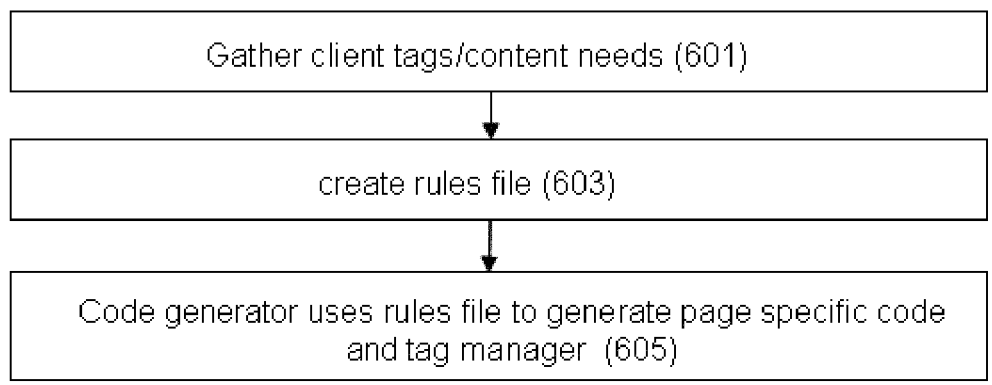
FIG. 6 shows a flow diagram for generating the tag/content manager in accordance with certain aspects of the disclosure.

Referring to FIG. 2, an illustrative system 200 for implementing methods according to the present disclosure is shown. As illustrated, system 200 may include one or more workstations 201. Workstations 201 may be local or remote, and are connected by one or more communications links 202 to computer network 203 that is linked via communications links 205 to tag/content manager 204. In certain embodiments, workstations 201 may be different storage/computing devices for storing and delivering client-specific program instructions or in other embodiments workstations 201 may be user terminals that are used to access a client website and/or execute a client-specific application. In system 200, manager 204 may be any suitable server, processor, computer, or data processing device, or combination of the same. Throughout this disclosure, tag/content manager 204 will be used to reference both the server/terminal that stores program instructions for tag/content management and the tag/content management program instructions themselves.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, hard-wired links, etc.

The steps that follow in the Figures may be implemented by one or more of the components in FIGS. 1 and 2 and/or other components, including other computing devices.

In some examples, a system is disclosed that results in an improved customer experience by accelerated page-load speeds. Aspects of the disclosed system pre-load web site assets (e.g., images, videos, audio, and other resources) for popular links, thus accelerating performance across a brand's site/domain (or sites/domains). Site performance has an impact on user engagement and directly impacts conversion metrics. As websites become more sophisticated, browsers have to pull down more resources during page load, resulting in slower site performance. Apart from technically optimizing each page for performance, there is little that the marketer can do to improve site performance.

Aspects of the disclosed system track popular (e.g., frequently accessed) URL paths within a brand's domains and calculate the most common paths based on aggregate data. A recommendation system may use at least some of the aggregate data to determine which pages are most likely to be next in a user's navigation sequence. The assets for the recommended pages may be pre-loaded, so that they are stored in the browser's cache. If a user proceeds to navigate to a recommended page, it will load quickly since the browser will already have most of the resources it needs to render the page. The disclosed URL prefetching features may optimize page-load performance across all (or at least some) of a brand's digital properties.

Figure 7A:
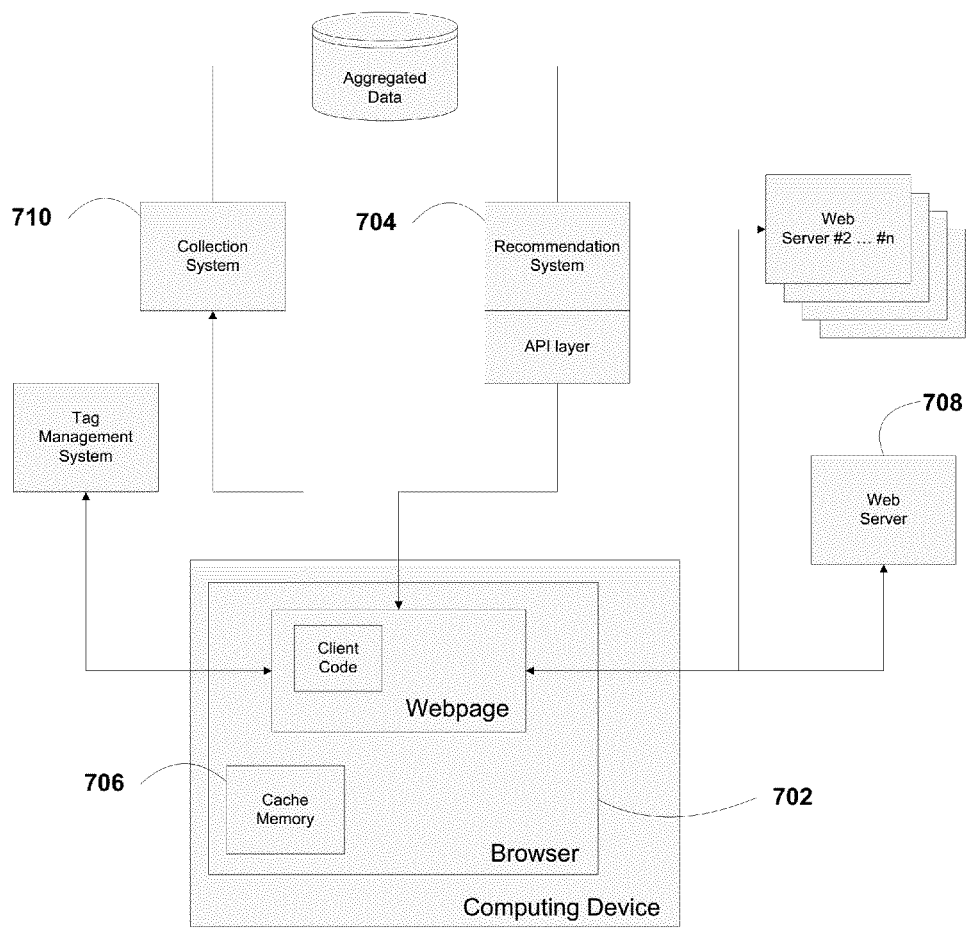
FIG. 7A and FIG. 7B illustrate examples of network configurations of various systems interacting in accordance with certain aspects of the disclosure.

While the disclosure contemplates numerous different approaches to implementing the disclosed system, in one example, the system may be implemented through server-side components, client-side components, and JSON. In addition, the system may be integrated with a tag management system (such as the system described in U.S. patent application Ser. No. 13/843,849) such that the prefetching may avoid skewing analytical result. For example, some web assets (e.g., images) are commonly used for web analytics, and would thus skew analytical results if they were requested prematurely. Part of the elegance of the prefetching design disclosed herein is that it avoids this outcome by way of being deployed through a tag management system (TMS). In a TMS implementation configured in accordance with the features disclosed herein, the analytics resources would be delivered asynchronously, via the TMS. In other words, they are not hard-coded onto the page and therefore would not be prefetched. As a result, the web analytics results would not be skewed as a result of prefetching. For example, see FIG. 7A, which illustrates just one example of a sample network configuration of the components/modules/systems interacting. Other configurations and interactions are contemplated (e.g., see FIG. 7B) and the illustration of FIG. 7A is not meant to be limiting.

In addition to, or in lieu of, pre-fetching assets for the likely page a user may go to, in another example, the system may be configured to process and pre-fetch a particular number of top widgets that a user might be interested in viewing/purchasing/etc. In one example, the systems and methods disclosed herein may be integrated with a recommendation engine (e.g., from a book retailer site, toy retailer site, music streaming site, movie streaming site, etc.) to pre-fetch the appropriate content/assets/resources in advance of a user's actual request for such content. As a result, the user experience may be greatly enhanced.

With respect to the step of prefetching the assets/content/resources, in one example, a browser client (e.g., client code executing in a browser) may execute Javascript (or other code) to perform the steps of accessing a data structure (e.g., a JSON value) to identify one or more recommended URLs to prefetch, getting the HTML web page corresponding to the URL, and then downloading/pre-fetching the appropriate resources/assets identified in the received HTML web page. Some illustrative pseudo-code (with various portions redacted/abbreviated for ease of readability) includes:

```
window[ensightenOptions.ns].prefetchURL = (function( ){
    var _private = {
        prefetchedList : [ ],
        httpGet: function(theUrl, cb) {
            cb = cb || function( ) { };
            var httpRequest;
            *** //depending on browser type, the object type created may differ
            httpRequest = new XMLHttpRequest( );
            httpRequest.open( "GET", theUrl);
            httpRequest.send( );
            httpRequest.onreadystatechange = function( ) {
                    *** // if httpRequest is in a ready state and appropriate status
                        cb(httpRequest.responseText);
        },
        getAttributes: function(elems, attr) {
          var attrs = [ ];
          *** // iterative loop for the length of the array
            var value = elems[i].getAttribute(attr);
            attrs.push(value);
          return attrs;
        },
        findDocumentAssets: function(htmlString) {
          if(!(document.implementation && document.implementation.createHTMLDocument)) return [ ];
          var assetUrls = [ ];
          *** // create "doc" HTMLDocument variable and set its innerHTML attribute to htmlString
          var scripts = doc.getElementsByTagName("script"), styles = doc.getElementsByTagName("link"),
                                    html = doc.getElementsByTagName("html"), styleA = [ ];
         *** // iterative loop for the length of array
                styleA.push(styles[i]);
            assetUrls.push.apply(assetUrls, (_private.getAttributes(scripts, "src")));
            assetUrls.push.apply(assetUrls, (_private.getAttributes(styleA, "href")));
            return assetUrls;
         }
    },
    return {
        prefetch: function(url) {
            _private.httpGet(url, function(data, err) {
                    var assets = _private.findDocumentAssets(data), i = 0, k = 0, skip = false;
                    var loadResource = function(asset){
                            if(!_private.dataNode){
                                    _private.dataNode = document.createElement('object');
                                    _private.dataNode.height = _private.dataNode.width = 0;
                                document.body.appendChild(_private.dataNode);
                            }
                            var o = document.createElement('object');
```

```
                    o.data = asset;
                    o.width = o.height = 0;
                    _private.dataNode.appendChild(o);
                            var parent = o.parentNode;
                            o.onload = function( ){
                                    parent.removeChild(o);
                            }
                    }
                    }
                    *** // for each of the assets in the array, as appropriate
                            if(window[ensightenOptions.ns].getIEVersion( ) >1){
                                    (new Image( )).src = assets[k];
                            }else{
                                    loadResource( assets[k]);
                            }
})( ).prefetch;
                    Psuedo-code ("prefetch.js")
```

In addition, the system may be configured as to when the prefetching may be performed. For example, the system may be configured so that prefetching does not interfere with the user's normal web experience. In one example, an administrator/user may provide rules in advance to configure the prefetching to occur after a "window.onload" occurs. Meanwhile, a different administrator may configure his/her site/sites to perform prefetching at a different time or upon an occurrence of an event/trigger.

In the pseudo-code above for pre-fetching, the steps are performed upon one or more recommended URLs for prefetching. The recommended URLs may be received from a remote server (e.g., a recommendation server) as data (e.g., JSON data) and then parsed/processed at the browser client to prepare for prefetching. Some illustrative pseudo-code (with various portions redacted/abbreviated for ease of readability) includes:

After the browser client has caused the browser to download and pre-fetch particular assets/resources, the browser software itself may cache the downloaded assets in cache memory (e.g., volatile memory). At a later time, when the browser requires particular assets, the browser may check the cache memory to determine if that asset has already been downloaded and cached. In some examples, the browser may also check whether the asset is stale by, for example, checking the "last modified" date on the server against that of the asset in the cache. Other techniques may be used to confirm the staleness/freshness of a cache. Once freshness is confirmed, the browser may access the cache memory to retrieve the asset/resource instead of downloading it from a remote server. As a result, the user experience may be improved.

Although browser software has been described in the preceding example, the disclosure is not so limited. Any client software/hardware may be used to implement the steps dis-

```
window[ensightenOptions.ns].getPageRecs = (function( ){
    return {
        getTopExitPages: function( ){
            // prefetchedList : [ ],
            var httpRequest;
                        *** //depending on browser type, the object type created may differ
                        httpRequest = new XMLHttpRequest( );
            var hashVal = _tinySHA1(window.location) + "_r"
            //The host in the below url will come from a config file.
            var theUrl = "http://localhost:3400/recommendations/" + hashVal
            httpRequest.open( "GET", theUrl);
            httpRequest.send( );
            httpRequest.onreadystatechange = function( ) {
                        *** // if httpRequest is in a ready state and appropriate status
                    var recs = JSON.parse(httpRequest.responseText);
                    for (var i in recs.recommendations) {
                        var topRec = recs.recommendations[i];
                        //     alert(topRec);
                        window[ensightenOptions.ns].prefetchURL(topRec)
                    }
    };
})( ).getTopExitPages;
                    Psuedo-code #2 ("recomend.js")
```

In the aforementioned example, JSON data may be received from the remote server to the browser client. The JavaScript Object Notation (JSON) standard formats human-readable text into name-value pairs to transmit data objects between a server and web applications. JSON is sometimes used in conjunction with, or in lieu of, XML. JSON is a language-independent data format and may be parsed/generated using various different programming languages, including JavaScript and other languages. In other examples, other data formats may be used to transmit information between the remote server and browser client.

closed herein, including but not limited to firmware executing in a settop box, software executing in a gaming console, an operating system executing on a smartphone, and other examples. In short, the client need not necessarily be tied to a browser, however, so long as particular features relied upon in a browser, such as the ability to cache an asset and later pull from that cache instead of re-downloading an asset, are also included in the replacement of the browser.

Figure 7B:
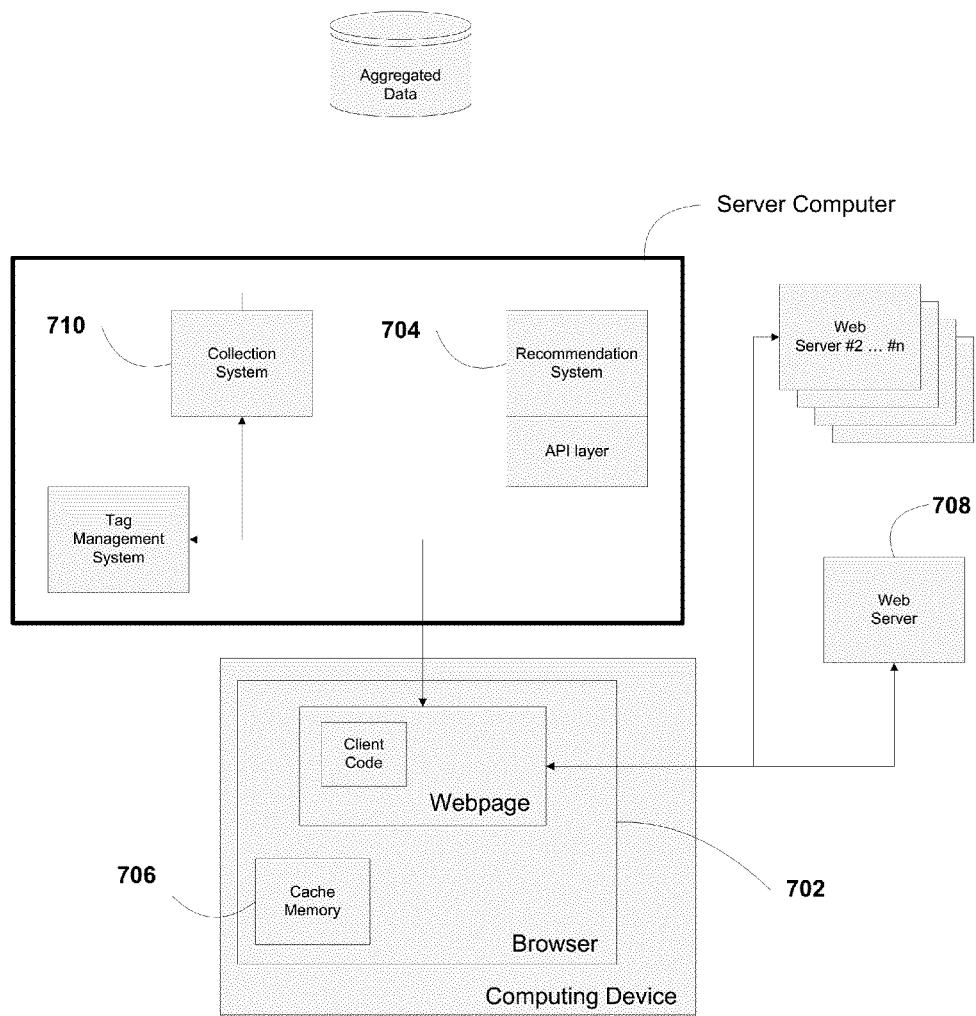

Complementary to the prefetching and caching capabilities described herein, the system may also include collection and recommendation capabilities, as illustrated in FIG. 7A and FIG. 7B.

When data is received by the collection system including information about what sequences are followed by a user (e.g., a user transitions from a first URL to a second URL), that data is received, processed, and/or stored by a collection system. Some illustrative pseudo-code (with various portions redacted/abbreviated for ease of readability) that may execute at the collection system server includes:

```
package com.ensighten.activate.recommendations.service;
*** // import various packages
public class RecommendationController {
    private static final ObjectMapper objectMapper = new ObjectMapper( );
    private CouchbaseClient couchbaseClient;
    ***// perform Exception handling of potential errors
    public Map<String, Object> read(Request request, Response response) throws IOException {
        response.setContentType(ContentType.JSON);
        response.setSerializationSettings(new SerializationSettings(ContentType.JSON, new ResponseProcessor(new JacksonJsonProcessor( ), new RawResponseWrapper( ))));
        Map<String, Object> result = new HashMap<>( );
        String id = request.getHeader("itemId");
        final String couchbaseResult = (String)couchbaseClient.get(id);
        result.put("recommendations", objectMapper.readValue(couchbaseResult, ArrayList.class));
        return result;
    }
}
```
Psuedo-code #3 ("recomendationController.java")

Consequently, the received data (e.g., JSON content) may be parsed/processed and then stored in a data store. Meanwhile, a recommendation system, as illustrated in FIG. 7A and FIG. 7B, may access and/or analyze the data in the data store. In one example, the recommendation system may simply access the data store and retrieve prefetch recommendations for a browser client. The recommendation may be based on the current location (e.g., URL) of the browser client. The data store may contain analysis of previously collected data from the collection system to arrive at the best recommendations for prefetching. As such, the recommendation system may access the data store and determines which web pages are most likely to be next in a user's navigation sequence. Some illustrative pseudo-code (with various portions redacted/abbreviated for ease of readability) that may execute at the recommendation system server includes:

```
package com.ensighten.activate.recommendations.service;
*** // import various packages
public class RecommendationServer {
    private static final Config config = ConfigFactory.parseFile(new File("conf/application.conf"));
    private static CouchbaseClient couchbaseClient;
    private static RestExpress server;
    public static void main(String[ ] args) throws NoSuchAlgorithmException, IOException {
        server = new RestExpress( )
            .setName("<<server name here>>")
            .addMessageObserver(new SimpleConsoleLogMessageObserver( ));
        *** // setupCouchbaseClient function
                String bucket = config.getString("couchbase.bucket");
                String[ ] hosts = config.getString("couchbase.host").split(";");
                String port = config.getString("couchbase.port");
                String base = config.getString("couchbase.base");
                List<URI> uris = new ArrayList<URI>( );
                    *** // iterative loop
                    uris.add(URI.create("http://" + host + ":" + port + "/" + base));
                couchbaseClient = new CouchbaseClient(uris, bucket, "");
        *** // execute defineRoutes(server) function
            server.uri("/recommendations/{itemId}", new RecommendationController(couchbaseClient))
                    .method( HttpMethod.GET)
                    .name("recommendations")
                    .parameter(Parameters.Cache.MAX_AGE, 3600);    // Cache for 1 hour
        int port = config.getInt("server.port");
        new CorsHeaderPlugin("*")
            .register(server);
        MetricRegistry registry = new MetricRegistry( );
        new MetricsPlugin(registry)
            .register(server);
        final Slf4jReporter reporter = Slf4jReporter.forRegistry(registry)
            .outputTo(LoggerFactory.getLogger(RecommendationServer.class))
            .convertRatesTo(TimeUnit.SECONDS)
            .convertDurationsTo(TimeUnit.MILLISECONDS)
            .build( );
```

```
    reporter.start(1, TimeUnit.MINUTES);
    server.bind(port);
    server.setUseTcpNoDelay(false);
    server.setKeepAlive(true);
    server.setSoLinger(0);
    *** // code to ensure proper shutdown
}
```
Psuedo-code #4 ("recomendationServer.java")

An illustrative value of prefetech recommendation data may include: "[\"http://www.acmestore.com/store\",\"https://www.acmestore.com/store/usa/en_US/CheckOfferEligibility\",\"https://www.acmestore.com/store/usa/en_US/DisplayDownloadHistoryPage/\",\"https://www.acmestore.com/store/usa/en_US/DisplayEditProfPage\",\"http://www.acmestore.com/store/usa/en_US/DisplayMainPage\",\"http://www.acmestore.com/store/usa/en_US/cat/Office/categoryID.01234\",\"http://www.acmestore.com/store/usa/en_US/cat/categoryID.01288\",\"https://www.acmestore.com/store/usa/en_US/DisplayAccountOrderPage/\",\"http://www.acmestore.com/store/usa/en_US/DisplayHelpContactPage/\",\"https://www.acmestore.com/store/usa/en_US/DisplayCheckoutAddressPaymentPage/choose.payment/errorCode.payment\"]"

For example, in some examples the data store may be formatted as SQL tables or other database format. In other examples, the data store may store JSON and use that information for a session that represents a user's visit. For example the below excerpt is a redacted portion from one session for an illustrative website visitor. As illustrated below, the JSON information may include more than just the next URL for prefetching, it may include various parameters and other information that may assist the recommendation system in computing:

```
{"referrer":{"query_pairs":{ },"path":null,"hostname":null,"is_secure":null,"anchor":null},"user_uuid":"2ed7c2e5-5638-4daa-8f59-2e6ee4dbfb38","geo":{"dma_code":511,"region":"VA","continent_code":"NA","metro_code":511,"area_code":703,"country_code":"US","country_name":"United States","city":"Ashburn","time_zone":"America/New_York","postal_code":null,"country_code3":"USA","longitude":-77.48750305175781,"latitude":39.043701171875},"request":{"query_pairs":{"vl":"1200","pid":"25","ch":"mobile_app","vn":"silverpop","ec":"0.67"},"cookie_pairs":{"uuid":"2ed7c2e5-5638-4daa-8f59-2e6ee4dbfb38"},"path":"/no-content","dnt":null,"is_secure":"false","anchor":null},"time_iso8601":"2014-02-18T20:45:06.287Z","time_epoch":1392756306287,"user_agent":{"os":{"minor":null,"family":null,"patch":null,"major":null},"minor":null,"family":null,"ua_string":null,"device":{"family":null},"patch":null,"major":null}}
{"referrer":{"query_pairs":{ },"path":null,"hostname":null,"is_secure":null,"anchor":null},"user_uuid":"2ed7c2e5-5638-4daa-8f59-2e6ee4dbfb38","geo":{"dma_code":511,"region":"VA","continent_code":"NA","metro_code":511,"area_code":703,"country_code":"US","country_name":"United States","city":"Ashburn","time_zone":"America/New_York","postal_code":null,"country_code3":"USA","longitude":-77.48750305175781,"latitude":39.043701171875},"request":{"query_pairs":{"vl":"15000","pid":"23","ch":"social","vn":"facebook","ec":"1"},"cookie_pairs":{"uuid":"2ed7c2e5-5638-4daa-8f59-2e6ee4dbfb38"},"path":"/no-content","dnt":null,"is_secure":"false","anchor":null}"time_iso8601":"2014-02-18T20:45:06.318Z","time_epoch":1392756306318,"user_agent":{"os":{"minor":null,"family":null,"patch":null,"major":null},"minor":null,"family":null,"ua_string":null,"device":{"family":null},"patch":null,"major":null}}
{"referrer":{"query_pairs":{ },"path":null,"hostname":null,"is_secure":null,"anchor":null},"user_uuid":"2ed7c2e5-5638-4daa-8f59-2e6ee4dbfb38","geo":{"dma_code":511,"region":"VA","continent_code":"NA","metro_code":511,"area_code":703,"country_code":"US","country_name":"United States","city":"Ashburn","time_zone":"America/New_York","postal_code":null,"country_code3":"USA","longitude":-77.48750305175781,"latitude":39.043701171875},"request":{"query_pairs":{"vl":"1200","pid":"25","ch":"mobile_app","vn":"silverpop","ec":"0.67"},"cookie_pairs":{"uuid":"2ed7c2e5-5638-4daa-8f59-2e6ee4dbfb38"},"path":"/no-content","dnt":null,"is_secure":"false","anchor":null},"time_iso8601":"2014-02-18T20:45:06.320Z","time_epoch":1392756306320,"user_agent":{"os":{"minor":null,"family":null,"patch":null,"major":null},"minor":null,"family":null,"ua_string":null,"device":{"family":null},"patch":null,"major":null}}
{"referrer":{"query_pairs":{ },"path":null,"hostname":null,"is_secure":null,"anchor":null},"user_uuid":"2ed7c2e5-5638-4daa-8f59-2e6ee4dbfb38","geo":{"dma_code":511,"region":"VA","continent_code":"NA","metro_code":511,"area_code":703,"country_code":"US","country_name":"United States","city":"Ashburn","time_zone":"America/New_York","postal_code":null,"country_code3":"USA","longitude":-77.48750305175781,"latitude":39.043701171875},"request":{"query_pairs":{"vl":"30000","pid":"27","ch":"social","vn":"criteo","ec":"3"},"cookie_pairs":{"uuid":"2ed7c2e5-5638-4daa-8f59-2e6ee4dbfb38"},"path":"/no-content","dnt":null,"is_secure":"false","anchor":null},"time_iso8601":"2014-02-18T20:45:06.321Z","time_epoch":1392756306321,"user_agent":{"os":{"minor":null,"family":null,"patch":null,"major":null},"minor":null,"family":null,"ua_string":null,"device":{"family":null},"patch":null,"major":null}}
{"referrer":{"query_pairs":{ },"path":null,"hostname":null,"is_secure":null,"anchor":null},"user_uuid":"2ed7c2e5-5638-4daa-8f59-2e6ee4dbfb38","geo":{"dma_code":511,"region":"VA","continent_code":"NA","metro_code":511,"area_code":703,"country_code":"US","country_name":"United States","city":"Ashburn","time_zone":"America/New_York","postal_code":null,"country_code3":"USA","longitude":-77.48750305175781,"latitude":39.043701171875},"request":{"query_pairs":{"vl":"15000","pid":"23","ch":"social","vn":"facebook","ec":"1"},"cookie_pairs":{"uuid":"2ed7c2e5-5638-4daa-8f59-2e6ee4dbfb38"},"path":"/no-content","dnt":null,"is_secure":"false","anchor":null},"time_iso8601":"2014-02-18T20:45:06.322Z","time_epoch":1392756306322,"user_agent":{"os":{"minor":null,"family":null,"patch":null,"major":null},"minor":null,"family":null,"ua_string":null,"device":{"family":null},"patch":null,"major":null}}
```

-continued

{"referrer":{"query_pairs":{ },"path":null,"hostname":null,"is_secure":null,"anchor":null},"user_uuid":"2ed7c2e5-5638-4daa-8f59-2e6ee4dbfb38","geo":{"dma_code":511,"region":"VA","continent_code":"NA","metro_code":511,"area_code":703,"country_code":"US","country_name":"United States","city":"Ashburn","time_zone":"America/New_York","postal_code":null,"country_code3":"USA","longitude":-77.48750305175781,"latitude":39.043701171875},"request":{"query_pairs":{"vl":"2000","cr":"var3","gl":"awareness","pdt":"product3","cmp":"","pid":"21","ch":"display","br":"brand3","vn":"adblade","ec":""},"cookie_pairs":{"uuid":"2ed7c2e5-5638-4daa-8f59-2e6ee4dbfb38"},"path":"/no-content","dnt":null,"is_secure":"false","anchor":null},"time_iso8601":"2014-02-18T20:45:06.323Z","time_epoch":1392756306323,"user_agent":{"os":{"minor":null,"family":null,"patch":null,"major":null},"minor":null,"family":null,"ua_string":null,"device":{"family":null},"patch":null,"major":null}}
{"referrer":{"query_pairs":{ },"path":null,"hostname":null,"is_secure":null,"anchor":null},"user_uuid":"2ed7c2e5-5638-4daa-8f59-2e6ee4dbfb38","geo":{"dma_code":511,"region":"VA","continent_code":"NA","metro_code":511,"area_code":703,"country_code":"US","country_name":"United States","city":"Ashburn","time_zone":"America/New_York","postal_code":null,"country_code3":"USA","longitude":-77.48750305175781,"latitude":39.043701171875},"request":{"query_pairs":{"vl":"3456","pid":"24","ch":"display","vn":"adroll","ec":"1.23"},"cookie_pairs":{"uuid":"2ed7c2e5-5638-4daa-8f59-2e6ee4dbfb38"},"path":"/no-content","dnt":null,"is_secure":"false","anchor":null},"time_iso8601":"2014-02-18T20:45:06.324Z","time_epoch":1392756306324,"user_agent":{"os":{"minor":null,"family":null,"patch":null,"major":null},"minor":null,"family":null,"ua_string":null,"device":{"family":null},"patch":null,"major":null}}
{"referrer":{"query_pairs":{ },"path":null,"hostname":null,"is_secure":null,"anchor":null},"user_uuid":"2ed7c2e5-5638-4daa-8f59-2e6ee4dbfb38","geo":{"dma_code":511,"region":"VA","continent_code":"NA","metro_code":511,"area_code":703,"country_code":"US","country_name":"United States","city":"Ashburn","time_zone":"America/New_York","postal_code":null,"country_code3":"USA","longitude":-77.48750305175781,"latitude":39.043701171875},"request":{"query_pairs":{"vl":"2000","cr":"var3","gl":"awareness","pdt":"product3","cmp":"","pid":"21","ch":"display","br":"brand3","vn":"adblade","ec":""},"cookie_pairs":{"uuid":"2ed7c2e5-5638-4daa-8f59-2e6ee4dbfb38"},"path":"/no-content","dnt":null,"is_secure":"false","anchor":null},"time_iso8601":"2014-02-18T20:45:06.326Z","time_epoch":1392756306326,"user_agent":{"os":{"minor":null,"family":null,"patch":null,"major":null},"minor":null,"family":null,"ua_string":null,"device":{"family":null},"patch":null,"major":null}}
{"referrer":{"query_pairs":{ },"path":null,"hostname":null,"is_secure":null,"anchor":null},"user_uuid":"2ed7c2e5-5638-4daa-8f59-2e6ee4dbfb38","geo":{"dma_code":511,"region":"VA","continent_code":"NA","metro_code":511,"area_code":703,"country_code":"US","country_name":"United States","city":"Ashburn","time_zone":"America/New_York","postal_code":null,"country_code3":"USA","longitude":-77.48750305175781,"latitude":39.043701171875},"request":{"query_pairs":{"vl":"50123","pid":"22","ch":"email","br":"Tommy","vn":"adroll","ec":"12"},"cookie_pairs":{"uuid":"2ed7c2e5-5638-4daa-8f59-2e6ee4dbfb38"},"path":"/no-content","dnt":null,"is_secure":"false","anchor":null},"time_iso8601":"2014-02-18T20:45:06.327Z","time_epoch":1392756306327,"user_agent":{"os":{"minor":null,"family":null,"patch":null,"major":null},"minor":null,"family":null,"ua_string":null,"device":{"family":null},"patch":null,"major":null}}
{"referrer":{"query_pairs":{ },"path":null,"hostname":null,"is_secure":null,"anchor":null},"user_uuid":"2ed7c2e5-5638-4daa-8f59-2e6ee4dbfb38","geo":{"dma_code":511,"region":"VA","continent_code":"NA","metro_code":511,"area_code":703,"country_code":"US","country_name":"United States","city":"Ashburn","time_zone":"America/New_York","postal_code":null,"country_code3":"USA","longitude":-77.48750305175781,"latitude":39.043701171875},"request":{"query_pairs":{"vl":"8777","pid":"26","ch":"mobile_app","vn":"silverpop","ec":"3.22"},"cookie_pairs":{"uuid":"2ed7c2e5-5638-4daa-8f59-2e6ee4dbfb38"},"path":"/no-content","dnt":null,"is_secure":"false","anchor":null},"time_iso8601":"2014-02-18T20:45:06.328Z","time_epoch":1392756306328,"user_agent":{"os":{"minor":null,"family":null,"patch":null,"major":null},"minor":null,"family":null,"ua_string":null,"device":{"family":null},"patch":null,"major":null}}
{"referrer":{"query_pairs":{ },"path":null,"hostname":null,"is_secure":null,"anchor":null},"user_uuid":"2ed7c2e5-5638-4daa-8f59-2e6ee4dbfb38","geo":{"dma_code":511,"region":"VA","continent_code":"NA","metro_code":511,"area_code":703,"country_code":"US","country_name":"United States","city":"Ashburn","time_zone":"America/New_York","postal_code":null,"country_code3":"USA","longitude":-77.48750305175781,"latitude":39.043701171875},"request":{"query_pairs":{"vl":"4500","pid":"28","ch":"social","vn":"facebook","ec":"2"},"cookie_pairs":{"uuid":"2ed7c2e5-5638-4daa-8f59-2e6ee4dbfb38"},"path":"/no-content","dnt":null,"is_secure":"false","anchor":null},"time_iso8601":"2014-02-18T20:45:06.329Z","time_epoch":1392756306329,"user_agent":{"os":{"minor":null,"family":null,"patch":null,"major":null},"minor":null,"family":null,"ua_string":null,"device":{"family":null},"patch":null,"major":null}}

ILLUSTRATIVE JSON VALUE

Aspects of the invention have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the invention.

In various examples, the following methods/apparatuses/systems are described:

First, a method comprising one or more of the following steps:
- Browser client 702 sends its URL to a recommendation system 704
- The recommendation system 704 determines one or more prefetch recommendations for the browser client 702
- The recommendation system 704 retrieves a JSON object (or other data structure) with the prefetch recommendations from a data store
- The recommendation system sends the JSON object (or other data structure) to the browser client
- The browser client receives the JSON object (or other data structure) and parses/interprets/processes the data contained therein
- At the appropriate time, the browser client 702 generates one or more asset/resource requests to one or more remote servers based on the parsed/processed/interpreted data
  - In some illustrative methods, the appropriate time may be based on particular rules provided by a client/customer/user/administrator
- The browser 702 receives the assets/resources from the remote servers and caches the assets/resources
- At a future visit to a particular URL including the assets/resources, the browser determines if the assets/resources are already saved in its cache memory 706 (and are not "stale")
- The browser 702 retrieves the assets/resources from its cache memory 706 instead of from the remote server 708, thus improving the user experience and/or performance Second, another method comprising one or more of the following steps:
- Receiving notification of a browser 702 changing from first URL to a second URL
- Recording in computer memory the transition from the first URL to the second URL
- Transmitting this transition information to a collection system 710
  - In some illustrative examples, the browser may identify its current location, and the recommendation/collection system 704, 710 may infer transition information based on a history of previous browser locations
- The collection system 710 saving the transition information in a data store
- A recommendation system 704 accessing and analyzing the transition information to formulate prefetch recommendations for a particular URL
  - In some illustrative methods, the recommendation system being specific to a particular user/entity (or group of users)
  - In some illustrative methods, the recommendation system being specific to a particular website/domain (or group of websites/domains)
  - In some illustrative methods, the recommendation system being based on particular rules provided by a client/customer/user/administrator (e.g., based on data usage charges, a user/device may be configured to automatically activate or deactivate the URL prefetch feature)
- The recommendation system periodically updating the prefetch recommendations based on updated transition information Third, a non-transitory computer-readable storage medium having computer-executable program instructions stored thereon that when executed by a processor, cause the processor to perform one or more of the method steps described above.

Fourth, an apparatus comprising: (1) a processor, and (2) a memory having stored therein computer executable instructions, that when executed by the processor, cause the apparatus to perform one or more of the method steps described above.

I claim:

1. A method comprising:
receiving, at a user terminal from a server computer, a tag manager comprising first program instructions configured to regulate execution of analytics tags at the user terminal, including asynchronous execution of the analytics tags at the user terminal;
receiving from the server computer, in response to a request sent by the tag manager executing on the user terminal to the server computer, analytics tags configured to execute at the user terminal, wherein the analytics tags are associated with a first web page;
determining, at the server computer, a second web page linked from the first web page;
determining, at the server computer, a third web page linked from the first web page;
after receiving notification of completion of loading of the first web page, downloading, at the user terminal, one or more analytics tags corresponding to the second web page and one or more analytics tags corresponding to the third web page;
bypassing execution, by the tag manager, of the downloaded analytics tags of the second web page and the third web page;
storing the downloaded analytics tags of the second web page and the third web page in a cache memory at the user terminal; and
in response to accessing one of the second web page and the third web page, providing, from the cache memory, one or more tags of the stored analytics tags instead of downloading again the one or more tags of the stored analytics tags.

2. The method of claim 1, wherein the second web page and the third web page comprise web pages mostly likely to be accessed after the first web page.

3. The method of claim 1, wherein determining the second web page and determining the third web page comprises analyzing URL paths.

4. A method comprising:
receiving, at a user terminal from a server computer, a tag manager comprising first program instructions configured to regulate execution of analytics tags at the user terminal, including asynchronous execution of the analytics tags at the user terminal;
receiving from the server computer, in response to a request sent by the tag manager executing on the user terminal to the server computer, analytics tags configured to execute at the user terminal, wherein the analytics tags are associated with a web page;
determining, at the server computer, a plurality of uniform resource locators (URLs) linked to the web page;
downloading, at the user terminal, a plurality of analytics tags corresponding to the plurality of URLs;
storing the plurality of analytics tags in a cache memory at the user terminal; and in response to a subsequent request for one or more analytics tags of the plurality of analytics tags, providing from the cache memory the requested one or more analytics tags instead of downloading the requested one or more analytics tags again.

5. The method of claim 4, wherein determining the plurality of URLs comprises determining the plurality of URLs based on analyzing aggregated transition information.

6. The method of claim 4, wherein determining the plurality of URLs comprises analyzing URL paths.

7. The method of claim 4, wherein the analytics tags corresponding to the plurality of URLs comprise analytics tags linked to by web pages associated with the plurality of URLs.

8. The method of claim 4, wherein the analytics tags corresponding to the plurality of URLs comprise analytics tags that would be downloaded by the user terminal when visiting the plurality of URLs.

9. The method of claim 4, wherein the downloading the analytics tags corresponding to the plurality of URLs comprises:
   downloading a first portion of the plurality of analytics tags at about a same time as when the user terminal requests a first web page; and
   downloading a second portion of the plurality of analytics tags after the user terminal has completed downloading the first web page.

10. An apparatus comprising:
   at least one computer processor; and
   one or more computer memories storing executable computer instructions that, when executed by the at least one computer processor, cause the apparatus to:
      receive, at a user terminal from a server computer, a tag manager comprising first program instructions configured to regulate execution of analytics tags at the user terminal, including asynchronous execution of the analytics tags at the user terminal;
      receive from the server computer, in response to a request sent by the tag manager executing on the user terminal to the server computer, analytics tags configured to execute at the user terminal, wherein the analytics tags are associated with a web page;
      determine, at the server computer, a plurality of uniform resource locators (URLs) linked to the web page;
      download, at the user terminal, a plurality of analytics tags corresponding to the plurality of URLs;
      store the plurality of analytics tags in a cache memory at the user terminal; and
      in response to a subsequent request for one or more analytics tags of the plurality of analytics tags, providing from the cache memory the requested one or more analytics tags instead of downloading the requested one or more analytics tags again.

11. The apparatus of claim 10, wherein determining the plurality of URLs comprises determining the plurality of URLs based on analyzing aggregated transition information.

12. The apparatus of claim 10, wherein determining the plurality of URLs comprises analyzing URL paths.

13. The apparatus of claim 10, wherein the analytics tags corresponding to the plurality of URLs comprise analytics tags that would be downloaded by the user terminal when visiting the plurality of URLs.

14. The apparatus of claim 10, wherein the downloading the analytics tags corresponding to the plurality of URLs comprises:
   downloading a first portion of the plurality of analytics tags at about a same time as when the user terminal requests a first web page; and
   downloading a second portion of the plurality of analytics tags after the user terminal has completed downloading the first web page.

\* \* \* \* \*